(12) United States Patent
Miyashita

(10) Patent No.: US 7,418,125 B2
(45) Date of Patent: Aug. 26, 2008

(54) POSITION DETECTION TECHNIQUE

(75) Inventor: Tomoyuki Miyashita, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 605 days.

(21) Appl. No.: 10/952,765

(22) Filed: Sep. 30, 2004

(65) Prior Publication Data

US 2005/0074160 A1 Apr. 7, 2005

(30) Foreign Application Priority Data

Oct. 3, 2003 (JP) ............................ 2003-345890

(51) Int. Cl.
*G06K 9/62* (2006.01)
*G06K 9/68* (2006.01)
*G06K 9/36* (2006.01)

(52) U.S. Cl. ..................... 382/151; 382/218; 382/280

(58) Field of Classification Search .............. 382/151, 382/218, 280
See application file for complete search history.

(56) References Cited

U.S. PATENT DOCUMENTS

| | | | | |
|---|---|---|---|---|
| 5,841,520 A | * | 11/1998 | Taniguchi | ..................... 355/53 |
| 6,101,267 A | * | 8/2000 | Shiraishi | ..................... 382/151 |
| 6,225,639 B1 | * | 5/2001 | Adams et al. | ............ 250/559.4 |
| 6,333,786 B1 | * | 12/2001 | Uzawa et al. | ................ 356/401 |
| 6,559,953 B1 | * | 5/2003 | Davids | ........................ 356/521 |
| 6,937,397 B2 | * | 8/2005 | Okuno et al. | ................ 359/575 |
| 7,039,889 B2 | * | 5/2006 | Takahashi et al. | .............. 716/9 |
| 7,181,057 B2 | * | 2/2007 | Adel et al. | .................. 382/144 |

FOREIGN PATENT DOCUMENTS

JP 2001-195583 7/2001

* cited by examiner

*Primary Examiner*—Matthew C. Bella
*Assistant Examiner*—Jose M Torres
(74) *Attorney, Agent, or Firm*—Fitzpatrick, Cella, Harper & Scinto

(57) ABSTRACT

An apparatus for detecting a position of a region, corresponding to a mark, in image data, as a mark position, the mark including periodically arranged patterns. A first unit obtains a real-space energy distribution which corresponds to an energy spectrum distribution of each partial area of the image data. A probability distribution obtaining unit obtains a probability distribution based on the real-space energy distribution, the probability distribution indicating repetitive positions of the periodically arranged patterns and the intensity of periodicity at this position. A second unit obtains a degree of correlation between each probability distribution obtained by the probability distribution obtaining unit and a pre-registered probability distribution of the mark, and a third unit obtains the mark position based upon the degrees of correlation obtained by the second unit.

18 Claims, 18 Drawing Sheets

FIG. 2A
FIG. 2B
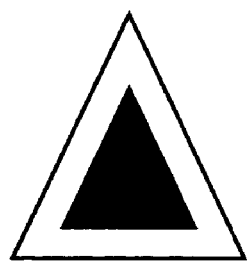
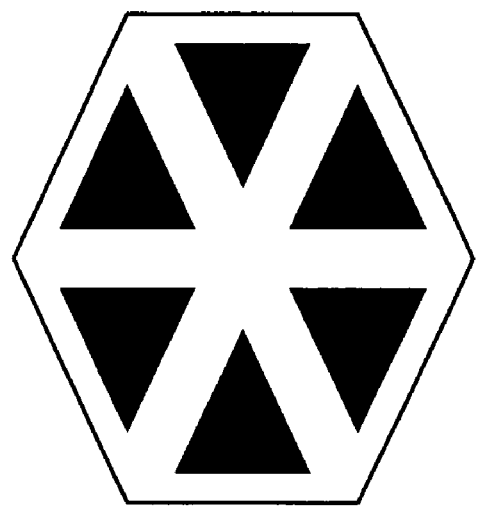

F I G. 13
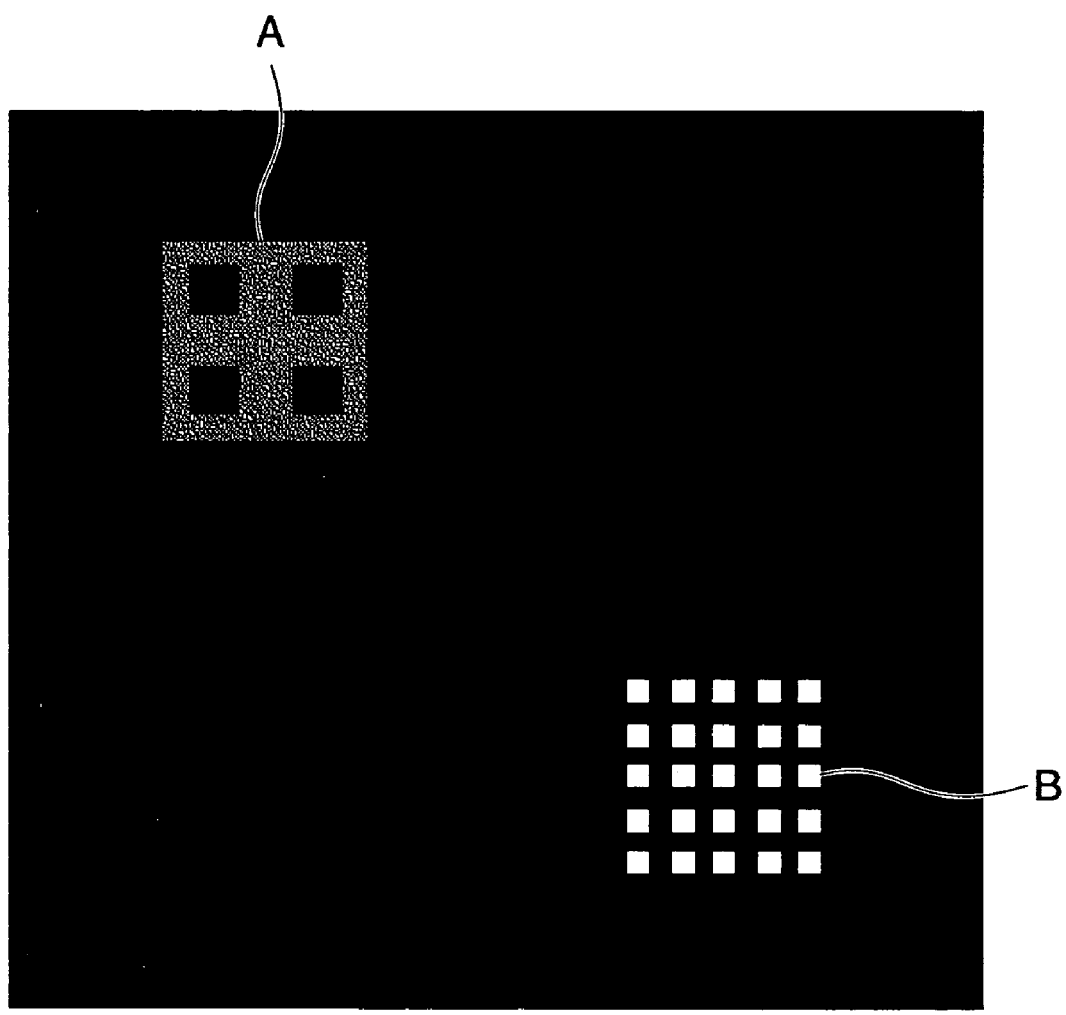

F I G. 16
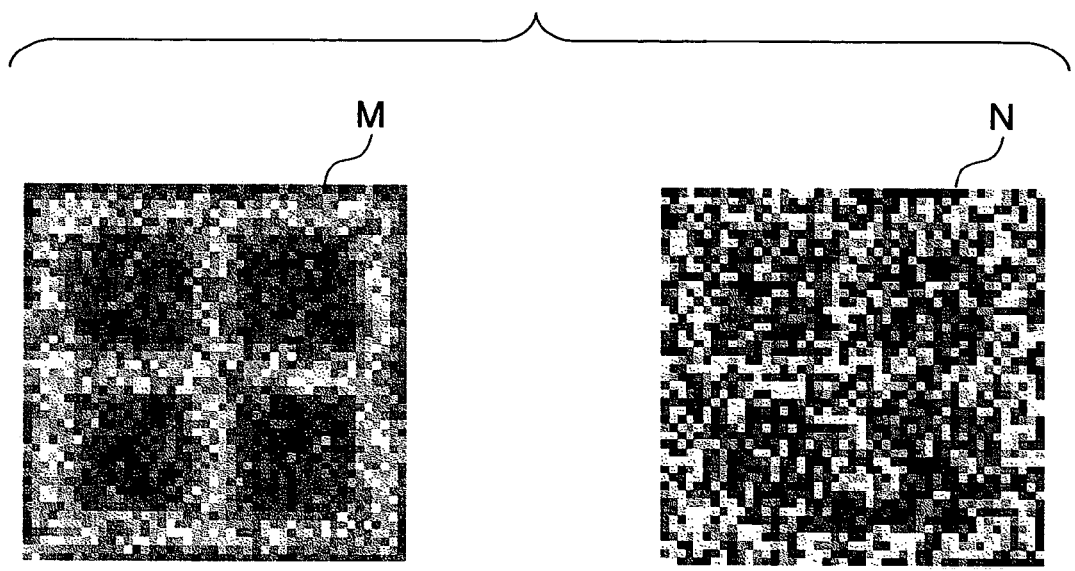

POSITION DETECTION TECHNIQUE

CLAIM OF PRIORITY

This application claims priority from Japanese Patent Application No. 2003-345890 filed on Oct. 3, 2003, which is hereby incorporated by reference herein.

FIELD OF THE INVENTION

This invention relates to a technique for detecting the position of a mark. More particularly, the invention relates to a technique for detecting a mark position using a digital image, e.g., a technique for detecting a mark position using image processing and pattern recognition technology in a semiconductor manufacturing apparatus employed in a production line.

BACKGROUND OF THE INVENTION

In a semiconductor manufacturing apparatus, alignment of a wafer and a reticle is carried out before a reticle pattern is projected onto the wafer to expose the wafer. In order to perform such alignment, usually, a digital image (referred to as an "observed image" below) centered on a mark on the wafer is loaded into the semiconductor manufacturing apparatus using an image input unit, such as a CCD, and the position of the mark in the observed image is detected using a pattern recognition technique. The detection procedure is divided into two parts, namely, first narrowing down a coarse position from the overall observed image and then detecting the precise position from the narrowed-down area.

The present invention focuses particularly on the narrowing down of the coarse position (referred to as "mark position detection" below) from the overall observed image in the detection part of the procedure.

Ordinarily, a pattern recognition technique is used in mark position detection. An evaluation value at each position of the observed image is calculated using this pattern recognition technique and the position having the largest evaluation value is adopted as the mark position.

Methods of performing pattern recognition used, therefore, include (i) a vector correlation method (see the specification of Japanese Patent Application Laid-Open No. 2001-195583) of calculating a degree of correlation of an image near a position of interest (this image shall be referred to as a "partial image" below) using edge information of a mark as a template, (ii) a cross-correlation method using luminance values of the image of the designed mark and of the observed image, and (iii) a cross-correlation method (referred to as a "Fourier phase correlation method" below) that uses an image (referred to as a "Fourier phase image" below), which is obtained by subjecting the image of the designed mark to a Fourier transform and then subjecting only the phase components thereof to an inverse Fourier transform, and the Fourier phase image of the observed image.

In a case where mark position detection is carried out using a pattern recognition technique of the kind cited as (i) to (iii) above, a rate of detection declines markedly owing to a decline in the image quality of the observed image. In order to expose a wafer to the same pattern in a semiconductor manufacturing apparatus, the same image should be captured as the observed image. However, owing to process fluctuations and illumination conditions, there are instances where (1) the average luminance of each partial image differs from one observed image to another, and (2) the difference between the amplitude of the mark signal and the amplitude of a noise signal diminishes.

Whether or not the prior art has robustness against the decline in image quality mentioned in (1) and (2) above will be discussed below in consideration of the theoretical strong points and shortcomings of the prior art.

First, a fundamental strong point of the vector correlation method is that since the strength of an edge at a determined position in the partial image is normalized to calculate the degree of correlation, it is possible to recognize the shape of a template not easily affected by the average luminance of the partial image. For example, as shown in FIG. 10, if a degree of correlation with respect to an image A of average luminance a and an image B of average luminance b obtained by changing the contrast of the image A is calculating using a template image T, the image A and the image B will both have the same value. FIGS. 11A and 11B illustrate examples of partial images. FIG. 12 illustrates an example of an observed image that includes partial images obtained by lowering the contrasts of the partial images in FIGS. 11A and 11B, to reduce the average luminance. FIG. 13 illustrates an example of an observed image that includes a partial image, the average luminance of which has been lowered by reducing the contrast of image in FIG. 11A, and the partial image in FIG. 11B. When a degree of correlation with respect to FIGS. 12 and 13 is calculated using a template image of FIG. 14, the values of the partial image A in FIG. 12 and partial image A in FIG. 13 are the same, and the values of the partial image B in FIG. 12 and partial image B in FIG. 13 are the same. In view of this fact, the vector correlation method is such that even in a case wherein the average luminance of each partial image differs from one observed image to another mentioned in (1) above, the same degree of correlation can be calculated stably if the shapes are the same.

Next, a fundamental shortcoming of the vector correlation method is that since the edge position of the mark is decided at only a plurality of points beforehand and a degree of correlation of the partial image calculated, there are cases where a partial image, in which an edge exists at a position other than the positions of the decided points, is mistaken as the mark. For example, a degree of correlation of a partial image S is calculated in advance using edge information at positions 1, 2, 3, 4 of a template image T in FIG. 15. The degree of correlation of the partial image S and the mark image is the same. Further, in a case wherein the difference between the amplitude of the mark signal and the amplitude of the noise signal diminishes as mentioned at (2) above, there are instances where the difference between edge information of the mark and edge information of a noise portion vanishes, thereby resulting in erroneous detection. For example, in a case wherein use is made of edge information at positions 1, 2, 3, 4 of the template image T in FIG. 15, there is almost no difference between the degrees of correlation of the mark image M and noise image N.

The fundamental strong point of the cross-correlation method and Fourier phase correlation method is that since the degree of correlation is calculated using luminance information of the entirety of the partial image, the degree of correlation of a partial image in which only the template image is present becomes higher than that of a partial image in which the template image and portions that do not exist in the template image are present at the same time, and, therefore, it is possible to distinguish between them. For example, if the template image T is used in FIG. 15, then the degree of correlation of the mark image will be higher than the degree of correlation of the partial image S.

However, a fundamental shortcoming of the cross-correlation method and Fourier phase correlation method is that since the degree of correlation is calculated using a variation in the luminance of the partial image, the degree of correlation is influenced by the average luminance of one partial image to another. For example, if FIG. 14 is used as the template image, there will be cases wherein the degree of correlation of the partial image A of high average luminance in the observed image of FIG. 12 will be higher than that of the partial image B of low average luminance, and cases wherein the degree of correlation of the partial image B of high average luminance in the observed image of FIG. 13 will be higher than that of the partial image A of low average luminance. This means that in a case wherein the average luminance of each partial image differs from one observed image to another in (1) above, erroneous detection may occur. Further, if the difference between the amplitude of the mark signal and the amplitude of the noise signal diminishes in (2) above, the difference between the mark image and the noise image becomes small and, moreover, the average luminance of the mark image and that of the noise image approach each other. Consequently, there are cases wherein erroneous detection occurs. For example, if the template image T of FIG. 15 is used, there is almost no difference between the degrees of correlation of the mark image M and noise image N in FIG. 16.

The following problems (A) to (C) arise owing to the fundamental shortcomings mentioned above:

(A) With the vector correlation method (i), there are instances where a partial image in which an edge exists at a position other than at the positions of a plurality of points decided in advance is erroneously detected as the mark.

(B) With the cross-correlation method (ii) or Fourier phase correlation method (iii), erroneous detection may occur if the average luminance of the mark image is lower than that of other portions.

(C) Further, a problem common to the vector correlation method, cross-correlation method and Fourier phase correlation method is that if the amount of noise in the observed image is great, the difference between the evaluation values of the mark and other portions diminishes, and may result in erroneous detection.

SUMMARY OF THE INVENTION

The present invention, which takes into consideration the conventional technique described above, has as its object to reduce erroneous detection of a mark position.

According to the present invention, the foregoing object is attained by providing an apparatus for detecting position of a region, corresponding to a mark, in image data, as a mark position, the mark including periodically arranged patterns, the apparatus comprising first means for obtaining a real-space energy distribution, which corresponds to an energy spectrum distribution of each partial area of the image data, second means for obtaining a degree of correlation between each real-space energy distribution obtained by the first means, and a real-space energy distribution of the mark, and third means for obtaining the mark position based upon the degrees of correlation obtained by the second means.

Further, the foregoing object is also attained by providing an exposure apparatus for exposing a substrate, having a mark, to a pattern, the apparatus comprises comprising an image input system, which inputs image data of the mark, and a detection system which detects a position of a region, corresponding to the mark, in the image data, as a mark position, the mark including periodically arranged patterns, the detection system comprises (i) first means for obtaining a real-space energy distribution which corresponds to an energy spectrum distribution of each partial area of the image data, (ii) second means for obtaining a degree of correlation between each real-space energy distribution obtained by the first means and a real-space energy distribution of the mark, and (iii) third means for obtaining the mark position based upon the degrees of correlation obtained by the second means.

Further, the foregoing object is attained by providing an exposure apparatus for exposing a substrate to a pattern due to an original having a mark, the apparatus comprising an image input system which inputs image data of the mark, and a detection system which detects a position of a region, corresponding to the mark, in the image data, as a mark position, the mark including periodically arranged patterns, the detection system comprising (i) first means for obtaining a real-space energy distribution which corresponds to an energy spectrum distribution of each partial area of the image data, (ii) second means for obtaining a degree of correlation between each real-space energy distribution obtained by the first means and a real-space energy distribution of the mark, and (iii) third means for obtaining the mark position based upon the degrees of correlation obtained by the second means.

Furthermore, the foregoing object is attained by providing a method of detecting a position of a region, corresponding to a mark, in image data, as a mark position, the mark including periodically arranged patterns, the method comprising a first step of obtaining a real-space energy distribution, which corresponds to an energy spectrum distribution of each partial area of the image data, a second step of obtaining degree of correlation between each real-space energy distribution obtained at the first step and a real-space energy distribution of the mark, and a third step of obtaining the mark position based upon the degrees of correlation obtained at the second step.

In accordance with the present invention, erroneous detection of a mark position can be reduced.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such an example, however, is not exhaustive of the various embodiments of the invention, and, therefore, reference is made to the claims which follow the description to determine the scope of the invention.

BRIEF DESCRIPTION OF THE DRAWINGS

FIGS. 2A and 2B are diagrams illustrating an example of a small figure constituting a mark and an example of the mark, respectively;

FIG. 13 is a diagram exemplifying an observed image that includes an image, the average luminance of which has been lowered by reducing the contrast of the image in FIG. 11A, and the image in FIG. 11B;

FIG. 16 is a diagram illustrating the fundamental shortcomings of the vector correlation method, cross-correlation method and Fourier phase correlation method;

DETAILED DESCRIPTION OF THE PREFERRED EMBODIMENTS

In order to solve the foregoing problems, the present invention compensates for the shortcomings of the prior art while exploiting the strong points thereof.

Specifically, the strong point of the cross-correlation method and Fourier phase correlation method is that these methods use luminance information at positions in the entirety of the partial image. The shortcoming of the vector correlation method is that positions at which information is used are limited. Accordingly, the present invention first uses luminance information at positions in the entirety of the partial image.

Next, the strong point of the vector correlation method is that shape recognition not influenced by the average luminance of the partial image can be carried out. The shortcoming of the cross-correlation method and Fourier phase correlation method is that the degree of correlation is affected by average luminance from one partial image to another. Accordingly, using luminance information at positions in the entirety of the partial image, the present invention generates a feature space in which a position at which a periodic pattern contained in the partial image appears and the intensity at this position can be evaluated quantitatively without being influenced by average luminance.

Specifically, the following three points have been achieved:

(i) Luminance information at positions in the entirety of the partial image is used.

(ii) A feature space, in which a position at which a periodic pattern contained in the partial image appears and the intensity at this position can be evaluated quantitatively, is generated using the luminance information (i).

As a result, in a case wherein a repeatedly appearing figure is present in a partial image, it is possible to ascertain, from one partial image to another, the probability at which the figure will be appear at a certain position.

Figure 1A:
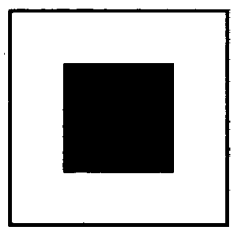
FIGS. 1A, 1B and 1C are diagrams illustrating an example of a small figure constituting a mark, an example of the mark and the feature space of FIG. 1B, respectively.
Figure 1B:
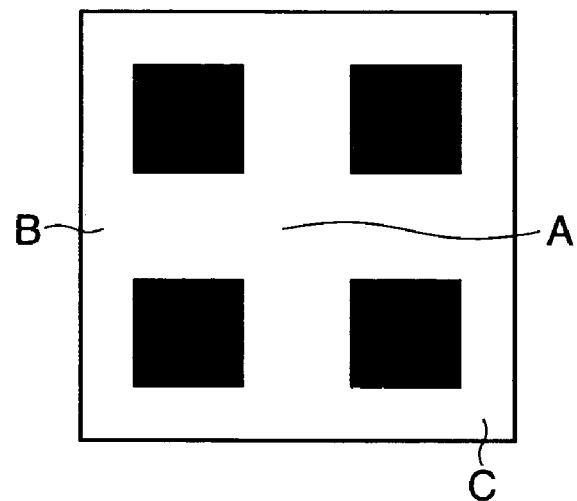
Figure 1C:
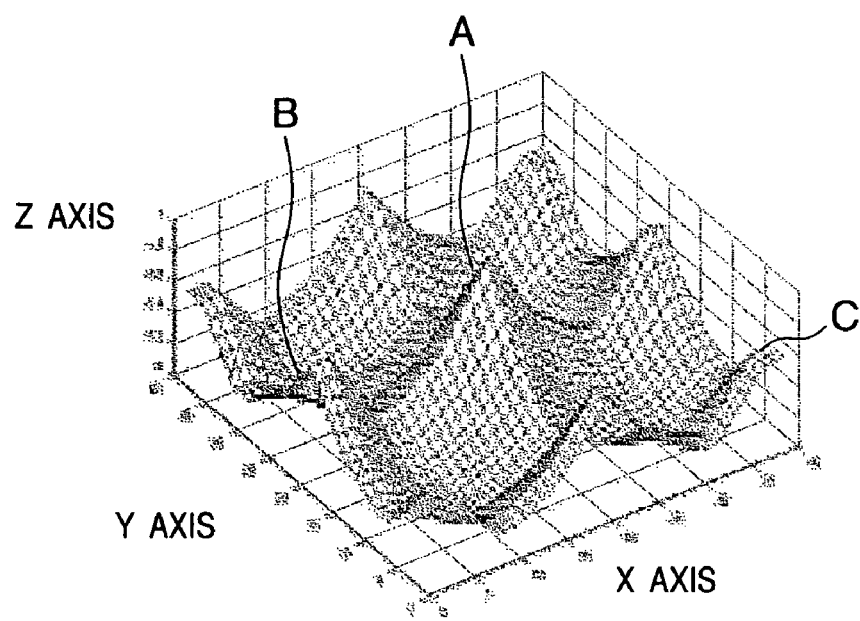

For example, if (i), (ii) mentioned above is implemented in the partial image of FIG. 1B composed of the figure shown in FIG. 1A, a feature space shown in FIG. 1C is generated. The X and Y axes of FIG. 1C correspond to the coordinate positions of the partial image. Further, the Z axis of FIG. 1C indicates the probability at which the figure appears. Four of the figures in FIG. 1A adjoin point A in FIG. 1B, two adjoin point B and one adjoins point C. The size of the Z axis in the feature space of FIG. 1C is used as a yardstick that corresponds to the number of adjoining features. The sizes (probabilities) of the Z axis at positions corresponding to the positions A, B, C in FIG. 1B are related as follows: probability at point A>probability at point B>probability at point C. This is the same order as that of the number of figures that adjoin these points.

(iii) The feature space in (ii) above is normalized using the maximum and minimum values of probability.

This makes it possible to realize a feature space that is not influenced by a variation in luminance from one partial image to another.

Accordingly, in the present invention, the following steps are executed to achieve (i), (ii) and (iii) above:

Step 1: It is assumed that a mark is composed of identical small figures (FIG. 1B, FIG. 2B, etc.).

Step 2: By using an orthogonal transform such as a Fourier transform, the repetitive position of a periodic pattern in a mark image and the intensity of periodicity (referred to as a "probability distribution" below) at this position are obtained and normalization is carried out using maximum and minimum values of intensity.

Step 3: Step 2 is executed for every partial image in an observed image.

Step 4: The position at which a feature is located in the probability distribution of a mark obtained at Step 2 is found.

Step 5: The degree of correlation between a component of the probability distribution of the mark at the position found in Step 4 and a component of the probability distribution of a partial image at the position found in Step 4 is obtained. This operation is performed for all partial images.

Step 6: The position of a partial image for which the degree of correlation found in Step 5 is largest is adopted as the mark position.

[Actions and Effects]

Figure 9:
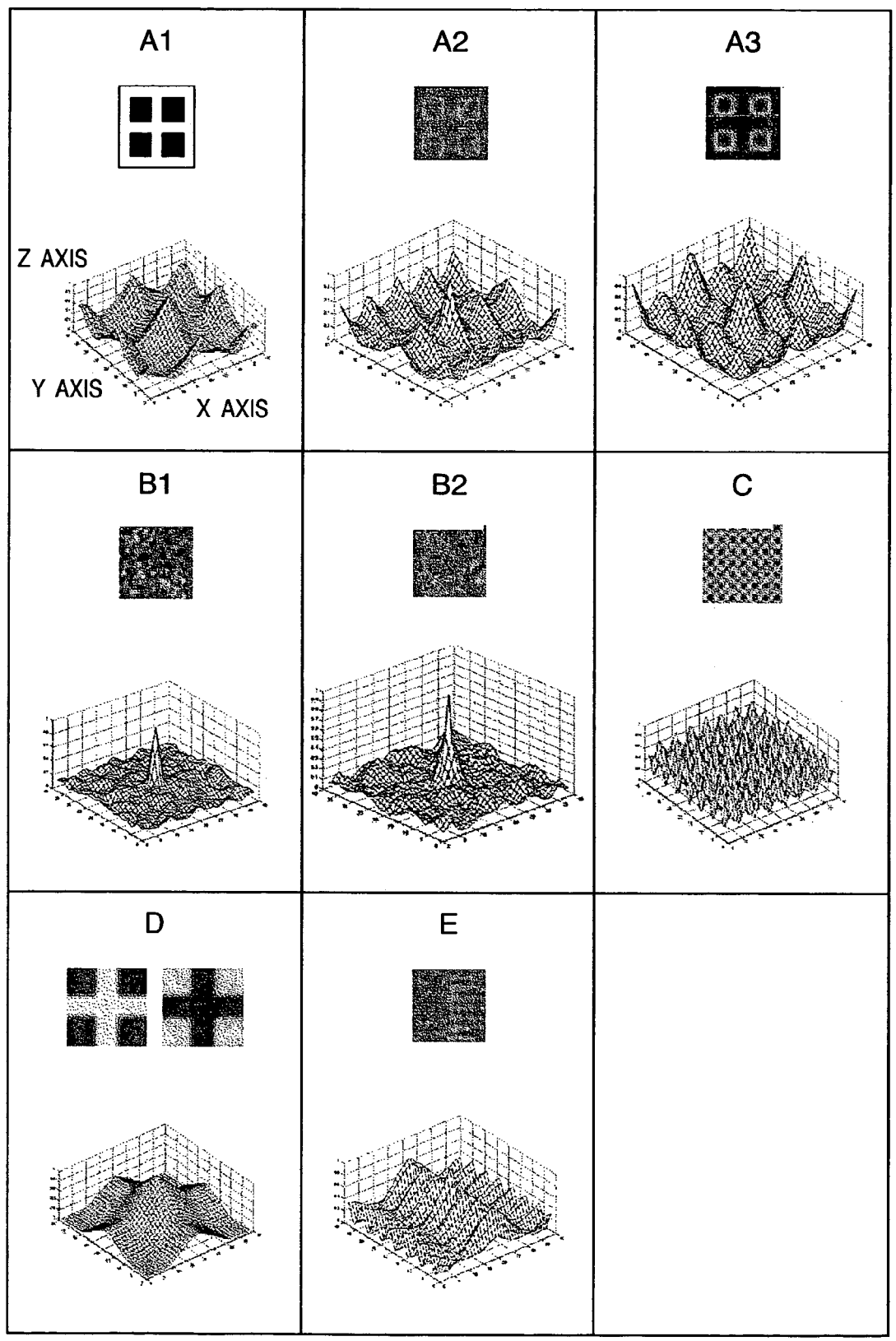
FIG. 9 is a diagram illustrating partial images above and their probability distributions below.
Figure 10:
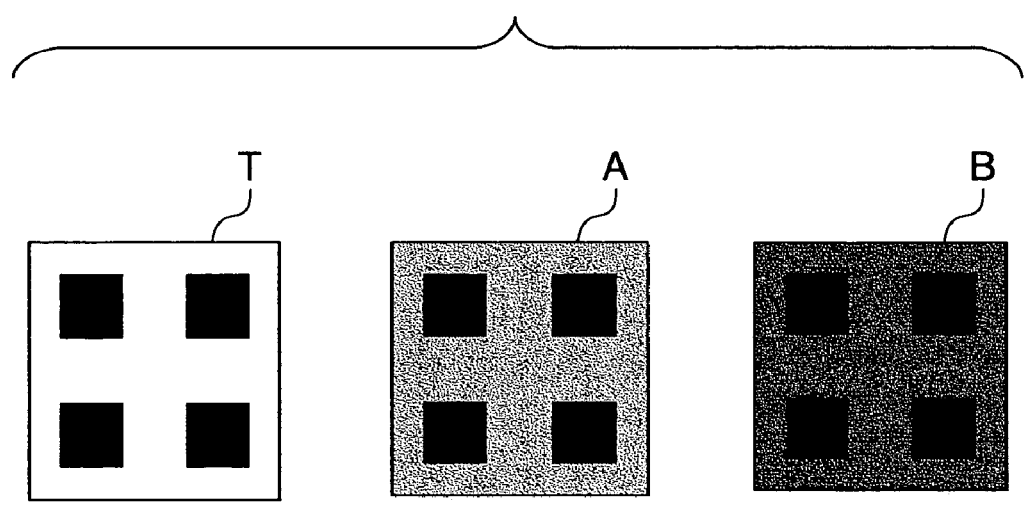
FIG. 10, which is a diagram showing the robustness of a vector correlation method, illustrates a template image T, an image A having an average luminance a and an image B having an average luminance b.
Figure 11A:
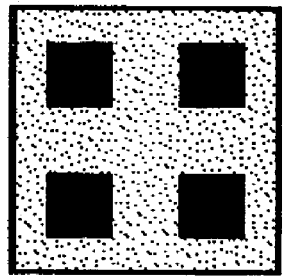
FIG. 11A is a diagram illustrating partial image A devoid of image quality degradation of that shown in FIG. 12.
Figure 11B:
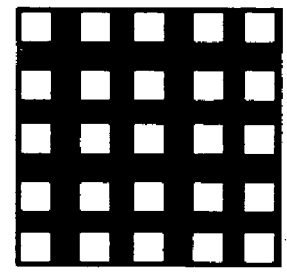
FIG. 11B is a diagram illustrating partial image B devoid of image quality degradation of that shown in FIG. 13.
Figure 12:
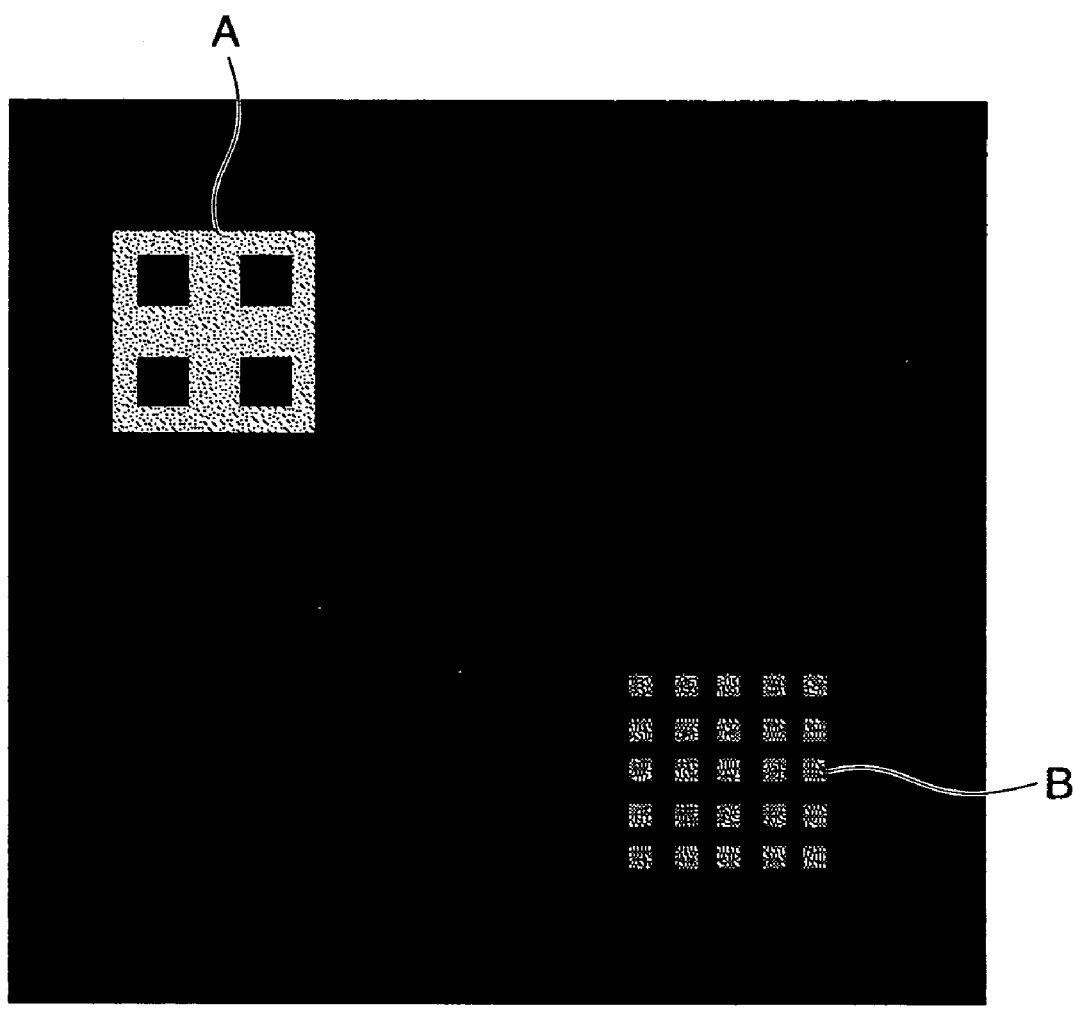
FIG. 12 is a diagram exemplifying an observed image that includes images, the average luminance of which has been lowered by reducing the contrasts of the images in FIGS. 11A and 11B.
Figure 14:
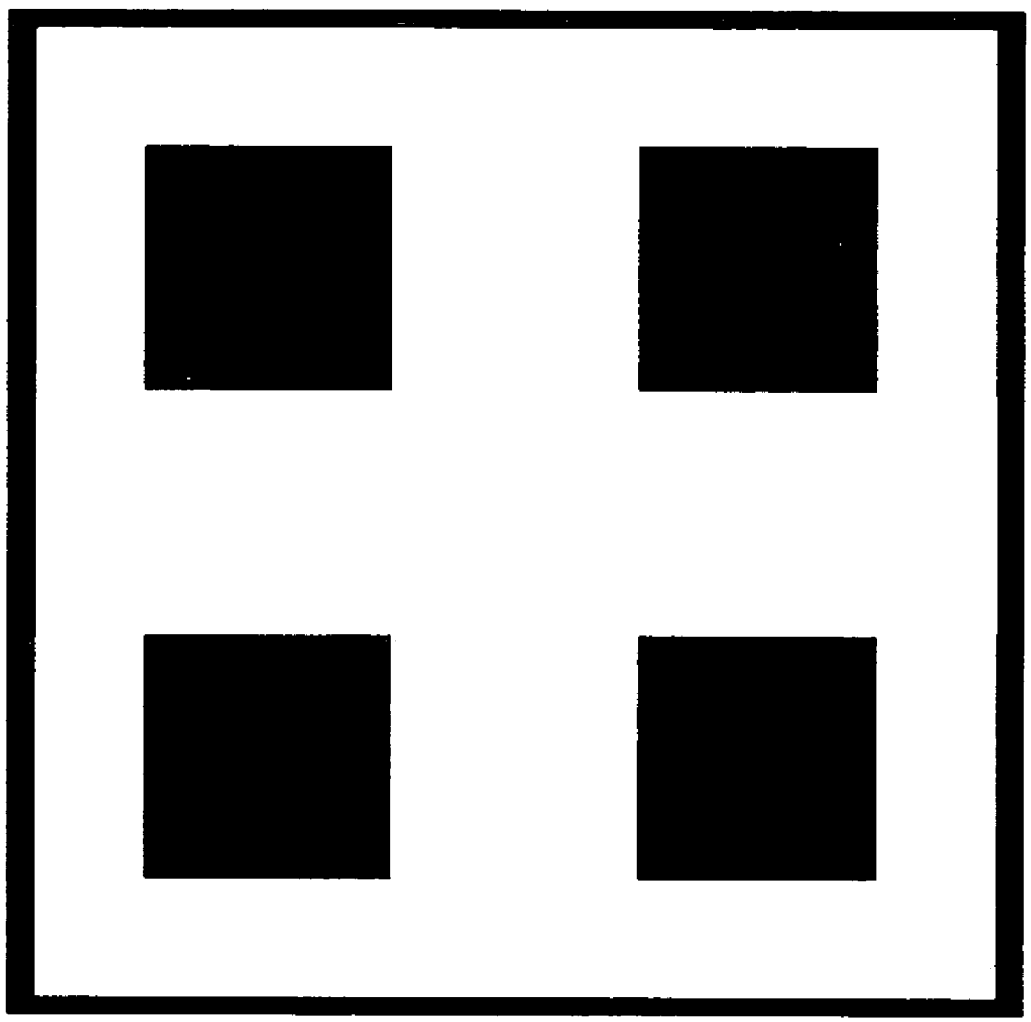
FIG. 14 is a diagram illustrating an image template used in FIGS. 11A, 11B and 12.
Figure 15:
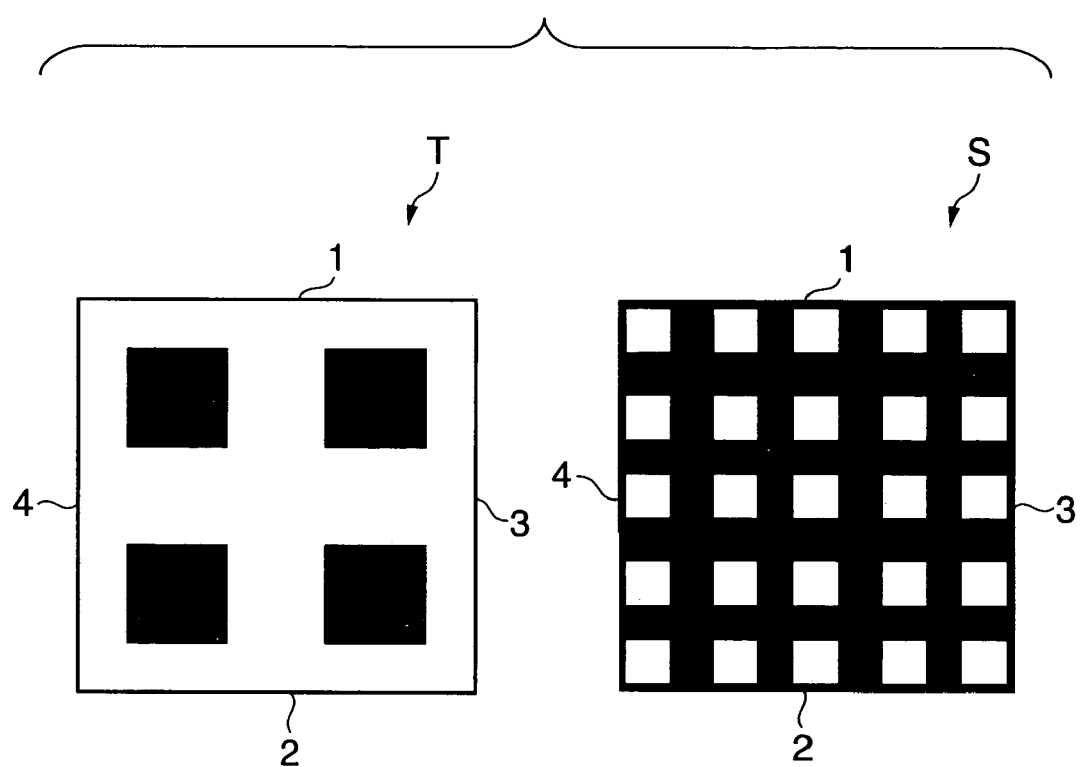
FIG. 15, which is a diagram showing the fundamental shortcomings of the vector correlation method, illustrates the fundamental strong points of the cross-correlation method and Fourier phase correlation method.

FIG. 9 is an example in which partial images are illustrated above their probability distributions. Image size is M×M pixels, probability variables are plotted along the X and Y axes of the probability distributions, and probability is plotted along the Z axis.

In FIG. 9, A1 represents an ideal mark image and its probability distribution; A2 and A3 represent mark images actually captured from a CCD camera and their probability distributions; B1 and B2 represent background images having considerable noise actually captured from a CCD camera and their probability distributions; C represents an image having many periodic patterns actually captured from a CCD camera and its probability distribution; and D and E represent images actually captured from a CCD camera and their probability distributions.

Though not shown in FIG. 9, the probability distributions of the above-mentioned images do not change even if the contrast of the images changes. Further, the probability distributions of the above-mentioned images do not change even if the average luminance of the images changes. As a result, the problem (B) encountered with the conventional pattern recognition techniques (ii), (iii) can be solved.

Next, it can be discriminated that the probability distributions of A2, A3 having a high correlation with the probability distribution of A1 are indicative of the mark. Furthermore, the correlation between the probability distribution of A1 and the probability distribution of each of the images other than the mark is very low in comparison with A2 and A3, and the difference between the degree of correlation of the mark image and the degree of correlation of each of the other images is made clear. As a result, the problems (A) and (C) encountered with the conventional pattern recognition techniques can be solved.

Accordingly, pattern recognition, which is robust with respect to degraded images can be carried out, and this leads to a reduction in the rate at which a mark is detected erroneously. For example, in the case of a semiconductor manufacturing apparatus, equipment shut-down owing to mark detection failure is reduced. This leads to an improvement in equipment availability rate and productivity.

Embodiments of the present invention will now be described in detail with reference to the accompanying drawings.

A semiconductor exposure apparatus in particular will be taken as an example in the embodiment described below, and a method of detecting the coarse position of a mark from the entirety of an observed image (this shall be referred to as "pre-alignment detection" below) will be described. Further, it will be assumed that the observed image loaded from an image input unit such as a CCD camera is a luminance image.

First Embodiment

Figure 3:
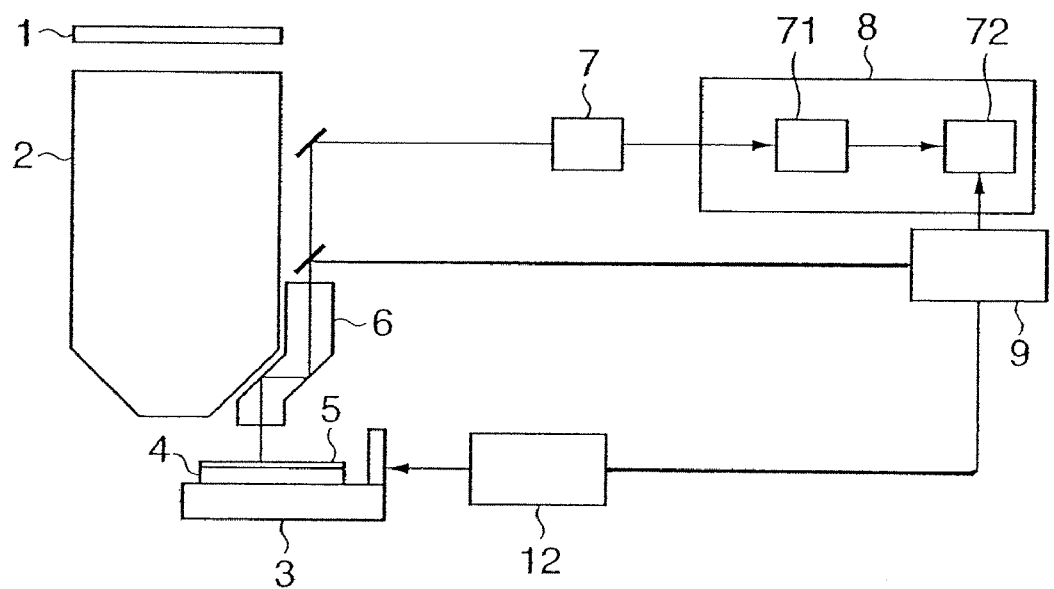
FIG. 3 is a diagram illustrating the structure of a semiconductor exposure apparatus according to an embodiment of the present invention.

FIG. 3 schematically illustrates the structure of a semiconductor exposure apparatus. A first embodiment of the present invention is applied to pre-alignment detection by an off-axis scope 6 in FIG. 3.

A pattern to undergo exposure is present on a reticle 1 and is illuminated using I-rays or an excimer laser in an illumination system (not shown). A wafer 5 is exposed to the pattern by a projection lens 2.

Pre-alignment is carried out upon placing the wafer in a wafer suction chuck 4 on an XY stage 3 by a wafer transport apparatus, not shown. Since the wafer 5 is placed in the chuck with the precision possessed by the transport apparatus, a transition to precise measurement of the wafer position cannot be performed, as is, in view of precision. Accordingly, a detection mark for pre-alignment (coarse alignment) on the wafer is observed by the off-axis scope 6 constructed externally of the projection lens 2 and an opto-electronic conversion is applied by a CCD camera 7, after which position information indicative of the detection mark is detected by a pre-alignment image processing unit 8. A video signal that is the result of the opto-electronic conversion is converted to digital information by an A/D converter 71 within the pre-alignment image processing unit 8, and the position of the pre-alignment mark is detected by an image processor 72, also located within the pre-alignment image processing unit 8.

The position of the XY stage 3 prevailing when the image of the pre-alignment mark is captured is measured accurately by a laser interferometer 12. An exposure-apparatus control unit 9 accurately measures the amount of deviation of the wafer 5, which has been placed in the chuck 4, from the deviation of the mark position and the position of the XY stage 3.

This embodiment will be described using dark field illumination as the illumination of the off-axis scope. With dark field illumination, scattered light from an edge position of the mark step is received as by a CCD camera. The present invention, however, can also be applied similarly to bright field illumination.

The mark involved in pre-alignment detection of this embodiment will be described next.

FIGS. 1A and 2A are examples of small figures that constitute marks. FIGS. 1B and 2B are examples of the marks composed of the small figures shown in FIGS. 1A and 2A, respectively.

Figure 4:
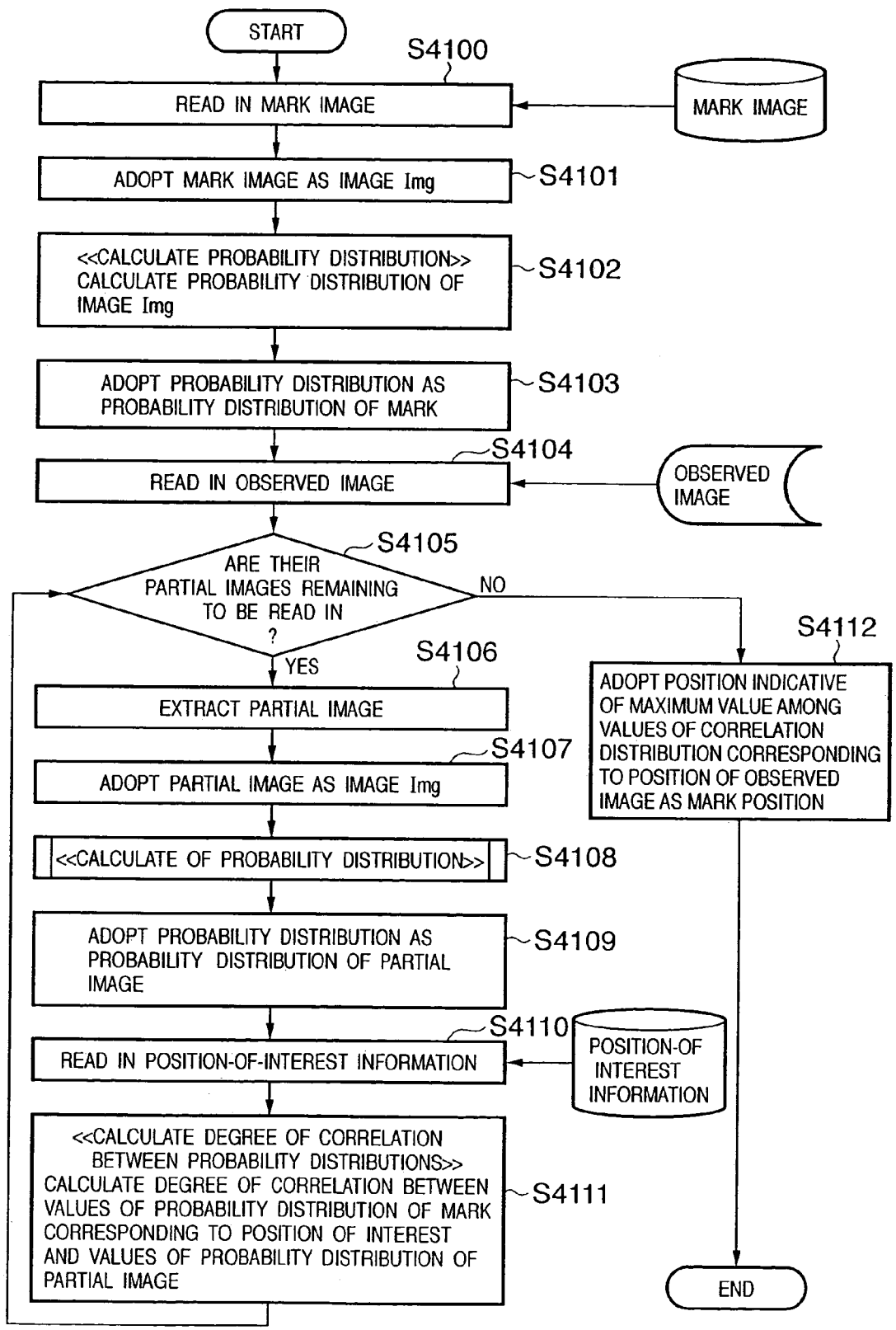
FIG. 4 is a flowchart illustrating overall processing for pre-alignment detection.

Reference will be had to FIG. 4 to describe processing for pre-alignment detection in the position detecting apparatus of this embodiment, and a semiconductor exposure apparatus that uses this position detecting apparatus.

FIG. 4 is a flowchart of processing.

In FIG. 4, a pre-registered image for a mark is read in from a storage device (S4100). This image is then assigned to a variable Img (S4101).

Next, the apparatus calculates the probability distribution indicating the repetitive position of a periodic pattern in the image Img of S4101, and the intensity of periodic repetition at this position (S4102).

The probability distribution of S4102 is adopted as the probability distribution of the mark (S4103).

Next, the probability distribution of a partial image is calculated by the following procedure:

An observed image is read in from an image input unit such as a CCD camera (S4104).

A partial image is extracted from the observed image (S4106).

The partial image extracted is assigned to the variable Img (S4107).

Next, the apparatus calculates the probability distribution indicating the repetitive position of a periodic pattern in the image Img of S4107 and the intensity of periodic repetition at this position (S4108).

The probability distribution of S4108 is adopted as the probability distribution of the partial image (S4109).

A position of interest registered beforehand is read in from the storage device (S4110).

The apparatus calculates a degree of correlation using the values of the probability distribution of the mark at S4103 corresponding to the position of interest of S4110, and the values of the probability distribution of the partial image at S4109, corresponding to the position of interest of S4110. This degree of correlation is adopted as the degree of correlation at the position of the partial image (S4111).

The operation of S4106 to S4111 is executed until partial images to be extracted no longer exist (S4105).

Finally, the position indicative of the maximum value, among the values of the correlation distribution corresponding to the position of the observed image obtained by performing the operation of S4100 to S4111, is adopted as the mark position (S4112).

Figure 5:
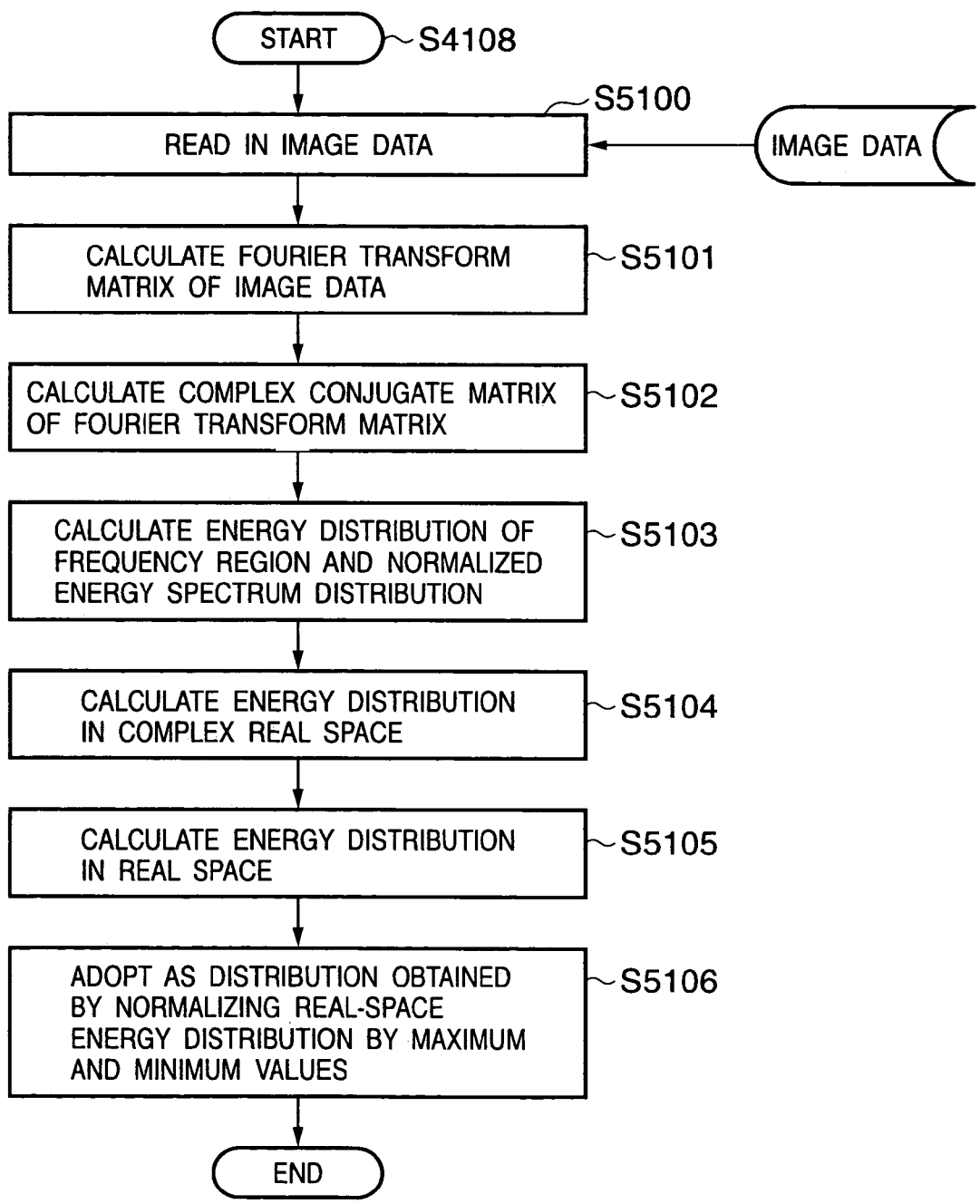
FIG. 5 is a flowchart illustrating processing for calculating probability distributions.

FIG. 5 illustrates the processing of steps S4102 and S4108 in FIG. 4 for calculating the probability distributions indicating the repetitive position of a periodic pattern in the image Img and the intensity of periodic repetition at this position (this calculation shall be referred to as a "probability distribution calculation"). The method of the probability distribution calculation will be described with reference to FIG. 5 below.

The variable Img at S4101 or S4107 in FIG. 4 is read in as image data (referred to as an "image matrix Img" below) (S5100).

Next, frequency decomposition is performed, the repetition intensity of the periodic pattern at the frequency positions is extracted as a distribution, and the distribution is returned to real space, whereby the intensity of repetition of the periodic pattern at the pixel positions is obtained. This processing is executed at S5101 to S5106.

Specifically, a matrix (referred to as a "Fourier transform matrix" below), which is the result of subjecting the image matrix Img of S5100 to a two-dimensional discrete Fourier transform, is calculated (S5101).

A complex conjugate matrix of this Fourier transform matrix is calculated (S5102).

The energy distribution of the frequency region is calculated by multiplying together the corresponding elements of the Fourier transform matrix and a complex conjugate matrix, and a matrix (referred to as a "normalized energy spectrum matrix" below) obtained by normalizing this distribution, is calculated (S5103).

The energy distribution in real space (referred to as a "complex real-space energy distribution" below) is calculated by a two-dimensional inverse discrete Fourier transform of the normalized energy spectrum matrix of S5103 (S5104).

The absolute values of the complex real-space energy distribution of S5104 are obtained and adopted as the real part only (this shall be referred to as a "real-space energy distribution" below) (S5105).

The apparatus calculates a distribution that is the result of normalizing the real-space energy distribution of S5105 by the maximum and minimum values of this distribution. The calculated distribution is adopted as the probability distribution of the image Img (S5106).

Thus, at S5101 to S5106, by using the two-dimensional discrete Fourier transform and the two-dimensional discrete inverse Fourier transform, frequency decomposition is performed, and the intensity of repetition of the periodic pattern at the frequency positions is extracted, and this distribution is returned to real space to obtain a distribution that indicates the intensity of repetition of a periodic pattern at pixel positions. However, equivalent processing can be executed also by using orthogonal transforms set forth below. Specifically, these transforms are a two-dimensional discrete wavelet transform and two-dimensional discrete inverse wavelet transform, a two-dimensional discrete cosine transform and a two-dimensional discrete inverse cosine transform, and a two-dimensional discrete sine transform and two-dimensional discrete inverse sine transform, etc.

Figure 6:
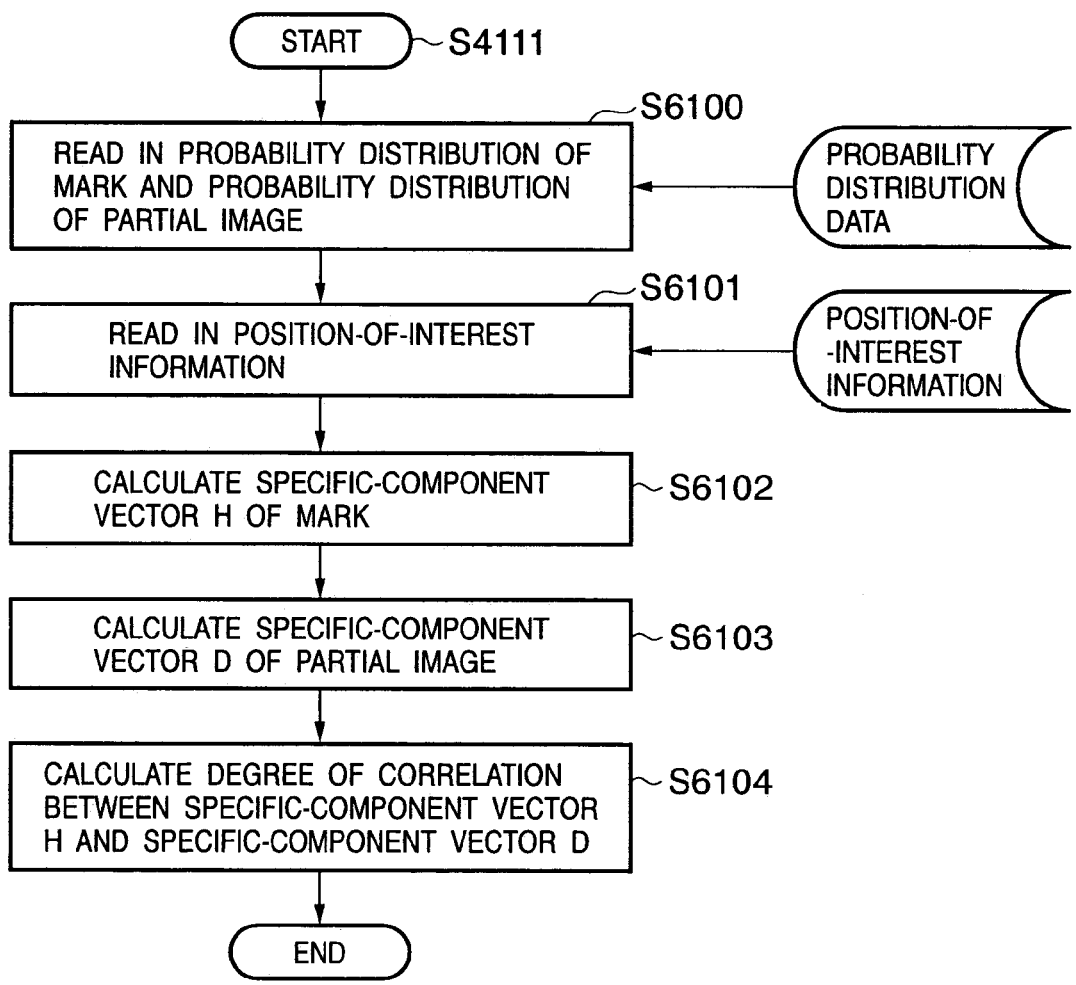
FIG. 6 is a flowchart illustrating processing for calculating a degree of correlation using a specific component of a probability distribution.

FIG. 6 illustrates the processing of S4111 in FIG. 4 (referred to as "calculation of degree of correlation between probability distributions" below). The method of this calculation of degree of correlation between probability distributions will be described in accordance with the procedure of FIG. 6.

First, the probability distribution of the mark and the probability distribution of the partial image in FIG. 4 are read in (S6100).

Next, the position-of-interest information that was read in at S4110 is read in. This position of interest is a position on the probability distributions (S6101).

The apparatus then calculates a vector (referred to as a "specific-component vector H" below) the elements of which are each of the values on the probability distribution of the mark corresponding to the position-of-interest information (S6102).

The apparatus further calculates a vector (referred to as a "specific-component vector D" below), the elements of which are each of the values on the probability distribution of the partial image corresponding to the position-of-interest information (S6103).

Finally, the degree of correlation between the specific-component vector H and the specific-component vector D is calculated (S6104).

Second Embodiment

In this embodiment, calculation by a method different from that of FIG. 6 described in the first embodiment is applied to the calculation of degree of correlation between probability distributions.

The processing for calculation of the degree of correlation between probability distributions differs from that of the first embodiment. Only the method of calculation of degree of correlation between probability distributions will be illustrated below.

Figure 7:
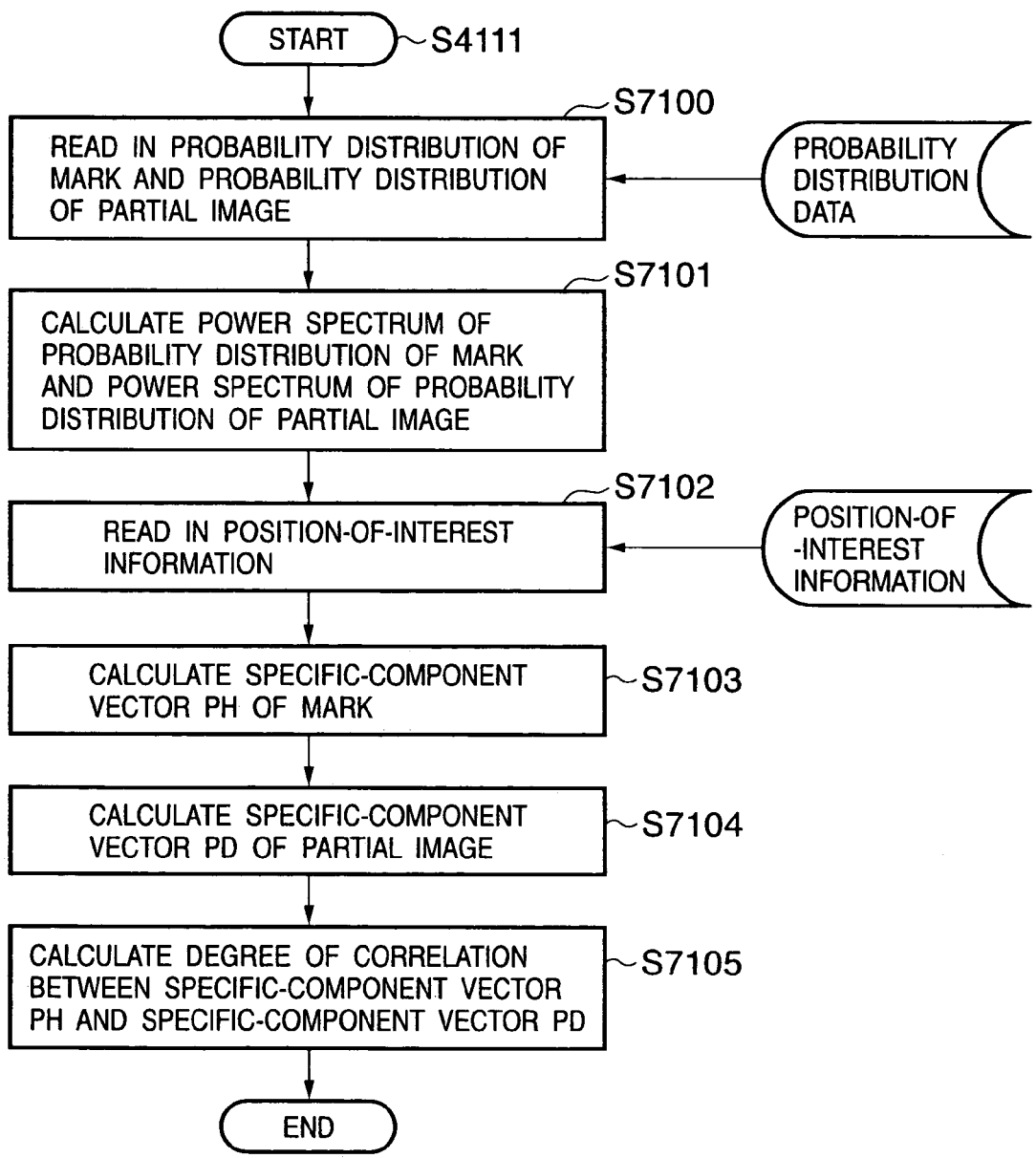
FIG. 7 is a flowchart illustrating processing for calculating a degree of correlation using a specific component of the power spectrum of a probability distribution.

FIG. 7 shows a processing of S4111 of FIG. 4. The method for calculating the degree of correlation between the probability distributions is explained in accordance with this process.

First, the probability distribution of the mark and the probability distribution of the partial image of FIG. 4 are read in (S7100).

Next, the power spectrum of the probability distribution of the mark and the power spectrum of the probability distribution of the partial image are read in (S7101).

The position-of-interest information that was read in at S4110 is read in. This position of interest is a frequency position in the space of the power spectrum (S7102).

The apparatus then calculates a vector (referred to as a "specific-component vector PH" below), the elements of which are each of the values in the power-spectrum space of the probability distribution of the mark corresponding to the position-of-interest information (S7103).

The apparatus then calculates a vector (referred to as a "specific-component vector PD" below), the elements of which are each of the values in the power-spectrum space of the probability distribution of the partial image corresponding to the position-of-interest information (S7104).

Finally, the degree of correlation between the specific-component vector PH and the specific-component vector PD is calculated (S7105).

Third Embodiment

In this embodiment, calculation by a method different from that of FIG. 6 described in the first and second embodiments is applied to the calculation of the degree of correlation between probability distributions. The processing for calculation of the degree of correlation between probability distributions differs from that of the first and second embodiments. Only the method of calculation of the degree of correlation between probability distributions will be illustrated below.

Figure 8:
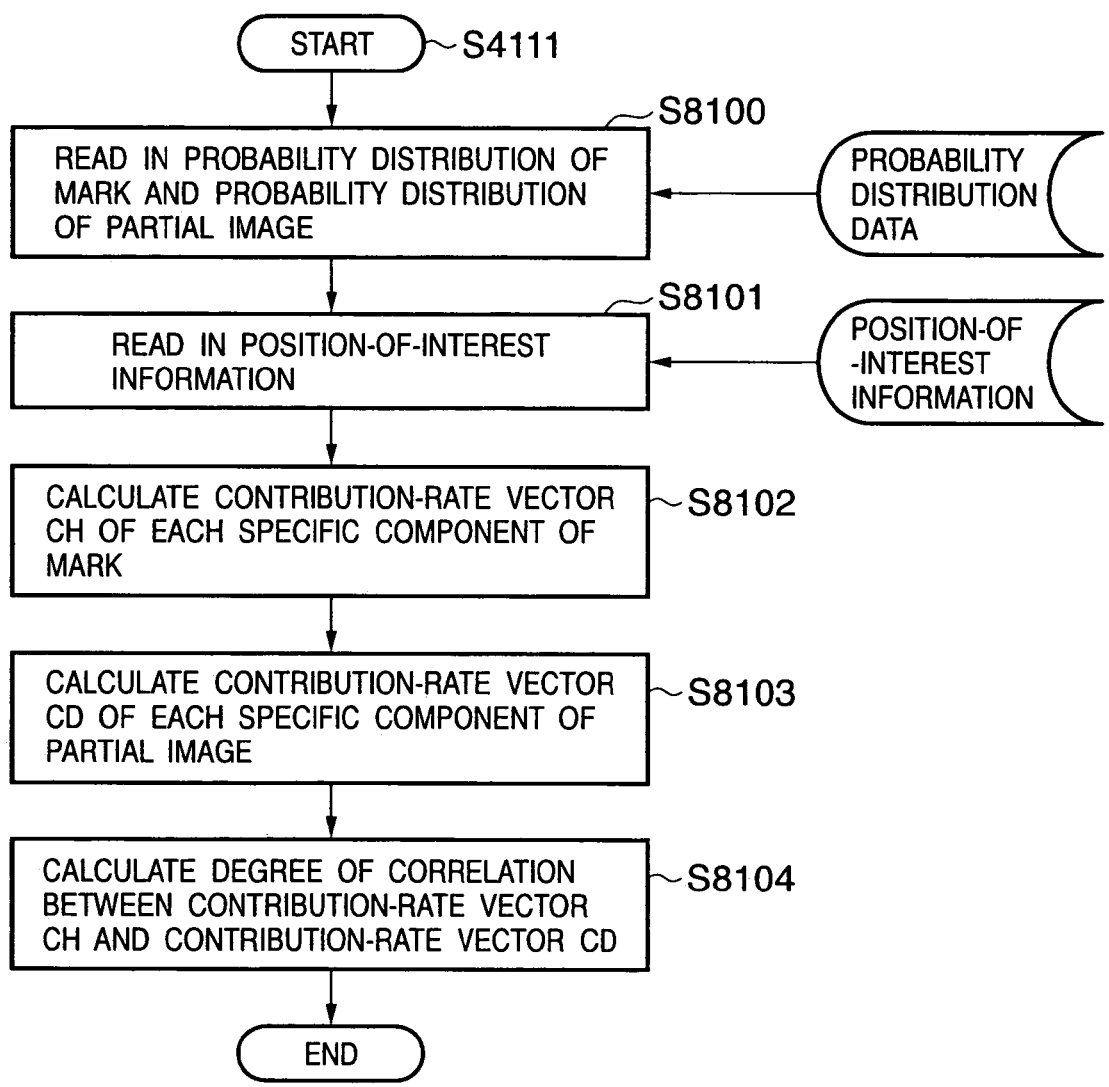
FIG. 8 is a flowchart illustrating processing for calculating a degree of correlation using the contribution rate of a specific component of a probability distribution.

FIG. 8 shows a processing of S4111 of FIG. 4. The method for calculating the degree of correlation between the probability distributions is explained in accordance with this process.

First, the probability distribution of the mark and the probability distribution of the partial image in FIG. 4 are read in (S8100).

Next, the position-of-interest information that was read in at S4110 is read in. This position of interest is a position on the probability distributions (S8101).

The apparatus then calculates a vector (referred to as a "contribution-rate vector CH" below), the elements of which are the ratios (contribution rates) of each of the values corresponding to the position-of-interest information to the sum of the values of the probability distribution of the mark corresponding to the position-of-interest information (S8102).

The apparatus further calculates a vector (referred to as a "contribution-rate vector CD" below), the elements of which are the ratios (contribution rates) of each of the values corresponding to the position-of-interest information to the sum of the values of the probability distribution of the partial image corresponding to the position-of-interest information (S803).

Finally, the degree of correlation between the contribution-rate vector CH and the contribution-rate vector CD is calculated (S8104).

[Device Manufacturing Method]

An embodiment of a method of manufacturing a device utilizing the exposure apparatus set forth above will now be described.

Figure 17:
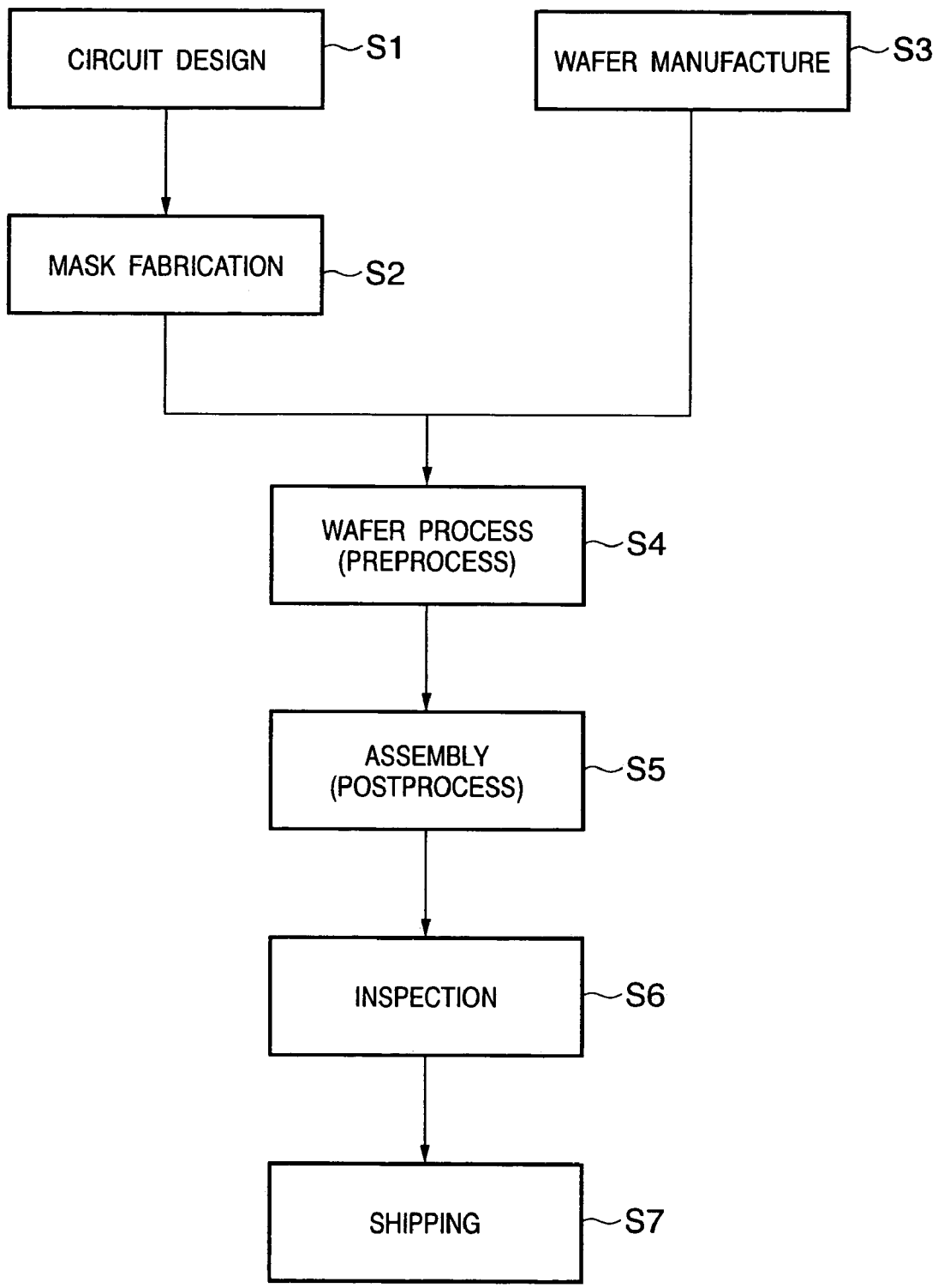
FIG. 17 is a diagram for describing the flow of manufacturing a microdevice.

FIG. 17 is a flowchart illustrating the manufacture of a microdevice (e.g., a semiconductor chip, such as an IC or LSI chip, a liquid crystal panel, a CCD, a thin-film magnetic head, a micromachine, etc.). The circuit of the semiconductor device is designed at step S1 (circuit design). A mask is fabricated at step S2 (mask fabrication) based upon the circuit pattern designed. A wafer is manufactured using a material such as silicon at step S3 (wafer manufacture). At step S4 (wafer process), which is referred to as a preprocess, an actual circuit is formed on the wafer by lithography using the wafer and the exposure apparatus in which the prepared exposure control data has been entered. At step S5 (assembly), which is referred to as a postprocess, semiconductor chips are formed from the wafer fabricated at step S4. This postprocess includes an assembly process (dicing and bonding) and a packaging process (chip encapsulation). The semiconductor device fabricated at step S5 is subjected to inspections, such as a test for confirmation of operation and a test of durability, at step S6 (inspection). These steps are executed to complete the manufacture of the semiconductor device, which is shipped at step S7.

Figure 18:
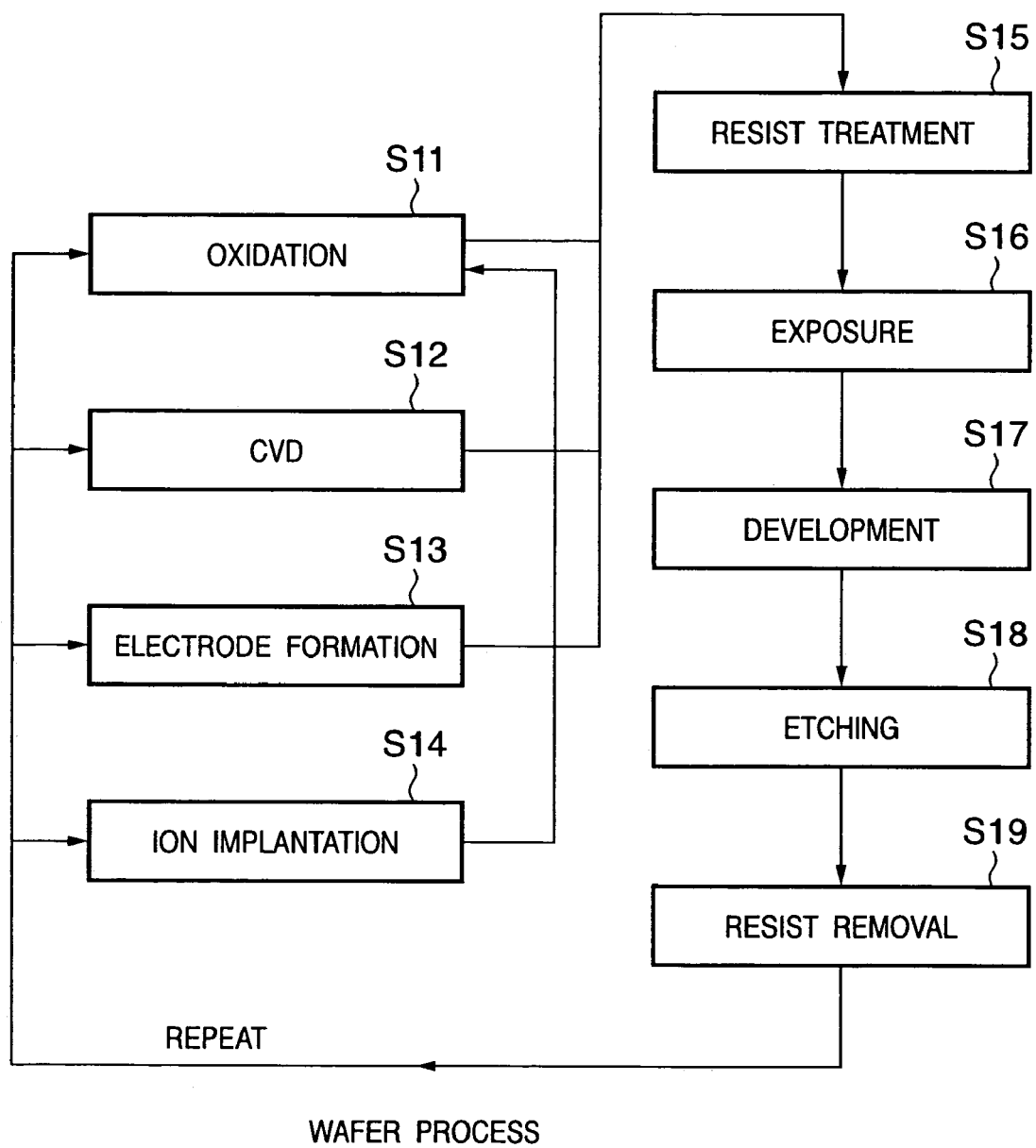
FIG. 18 is a diagram for describing a wafer process.

FIG. 18 is a flowchart showing the wafer process in detail. The surface of the wafer is oxidized at step S11 (oxidation), and an insulating film is formed on the wafer surface at step S12 (CVD). An electrode is formed on the wafer by vapor deposition at step S13 (electrode formation), and ions are implanted in the wafer at step S14 (ion implantation). The wafer is coated with a photosensitive agent at step S15 (resist treatment). The circuit pattern is printed on the wafer by exposure at step S16 (exposure) using the exposure apparatus described above. The exposed wafer is developed at step S17 (development) and portions of the wafer other than those having the developed resist image are etched away at step S18 (etching). The unnecessary resist left after etching is removed at step S19 (resist removal). Repeating these steps forms multiple circuit patterns on the wafer.

If the method of manufacture according to this embodiment is used, a semiconductor device having a high degree of integration, which is difficult to manufacture conventionally, can be manufactured at low cost.

Other Embodiments

There are cases wherein the object of the invention is attained also by supplying a software program, which implements the position detecting method or exposure method that includes the method of calculating probability distributions according to the above-described embodiments, directly or remotely to a system or an apparatus, reading the supplied program codes with a computer of the system or apparatus, and then executing the program codes. In this case, as long as the system or apparatus has the functions of the program, the mode of implementation need not rely upon a program.

Accordingly, since the functional processing of the present invention is implemented by a computer, the program codes per se installed in the computer also implement the present invention. In other words, the embodiments of the present invention also cover a computer program that is for the purpose of implementing the functional processing of the present invention.

In this case, as long as the system or apparatus has the functions of the program, the form of the program, e.g., object code, a program executed by an interpreter or print data supplied to an operating system, etc., does not matter.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, a DVD (DVD-ROM, DVD-R), etc.

As for the method of supplying the program, a client computer can be made to access a website on the Internet using a browser possessed by the client computer, and the computer program per se of the present invention, or an automatically installable compressed file of the program can be downloaded to a recording medium, such as a hard disk. Further, the program of the present invention can be supplied by dividing the program code constituting the program into a plurality of files and downloading the files from different websites. In other words, a WWW (World Wide Web) server that downloads, to multiple users, the program files that implement the functional processing of the present invention by computer also is covered by the embodiments of the present invention.

Further, it is also possible to store the program of the present invention on a storage medium, such as a CD-ROM, upon encrypting the program, to distribute the storage medium to users, to allow users who meet certain requirements to download decryption key information from a website via the Internet, and to allow these users to run the encrypted program by using the key information, whereby the program is installed in the user computer.

Furthermore, besides the case wherein the aforesaid functions according to the embodiments are implemented by executing the read program by computer, an operating system, or the like, running on the computer may perform all of or a part of the actual processing, so that the functions of the foregoing embodiments can be implemented by this processing.

Furthermore, after the program read from the storage medium is written to a function expansion board inserted into the computer, or to a memory provided in a function expansion unit connected to the computer, a CPU, or the like, mounted on the function expansion board or function expansion unit, performs all of or a part of the actual processing, so that the functions of the foregoing embodiments can be implemented by this processing.

Examples of the present invention will now be set forth.

First Example

A first example of the invention is a position detecting apparatus comprising image capture means for capturing a mark, which is composed of a plurality of identical figures, as an image, calculating means for calculating, for each partial image area in the image, probability that the figures constituting the mark will exist at a prescribed position, and position detecting means for adopting, as mark position, a position indicating a maximum value in a two-dimensional array of probabilities calculated by the calculating means.

Second Example

In the first example, the calculating means obtains the probability by calculating a degree of correlation between a probability distribution, which indicates a position of a periodic pattern that exists in the partial image area and the probability that this periodic pattern will exist at this position, and a probability distribution of a mark image desired to be detected.

Third Example

In the second example, the calculating means obtains the degree of correlation between the probability distributions by calculating a correlation value between specific components, or a correlation value between specific components in power spectrums of probability distributions, or a correlation value between contribution rates of specific components in probability distributions or power spectrums of probability distributions.

Fourth Example

In the second example, the calculating means includes first energy distribution calculating means for calculating an energy distribution of a frequency region obtained by orthogonally transforming a partial image, and second energy distribution calculating means for calculating a real-space energy distribution obtained by subjecting the energy distribution of the frequency region obtained by the first energy distribution calculating means to a transform that is the inverse of the orthogonal transform used by the first energy distribution calculating means.

Fifth Example

In the fourth example, the energy distribution of the frequency region is calculating using at least one transform from among a discrete Fourier transform, discrete wavelet transform, two-dimensional discrete cosine transform and a two-dimensional discrete sine transform.

Sixth Example

In the fourth example, the real-space energy distribution is calculated using at least one transform from among a discrete inverse Fourier transform, a discrete inverse wavelet transform, a two-dimensional discrete inverse cosine transform and a two-dimensional discrete inverse sine transform.

Seventh Example

In the fourth example, the energy distribution of the frequency region has been normalized by maximum and minimum values.

Eighth Example

In the fourth example, the real-space energy distribution has been normalized by maximum and minimum values.

Ninth Example

In the third example, the specific component is a probability distribution in an image of a template mark, or a power spectrum of the probability distribution, or a vector in which values at positions indicating features of the probability distribution or of power spectrum of the probability distribution are elements.

Tenth Example

A tenth example of the invention is a position detecting method comprising an image capture step of capturing a mark, which is composed of a plurality of identical figures, as an image, a calculating step of calculating, for each partial image area in the image, probability that the figures constituting the mark will exist at a prescribed position, and a position detecting step of adopting, as a mark detection position, a position indicating a maximum value in a two-dimensional array of probabilities calculated at the calculating step.

Eleventh Example

An eleventh example of the invention is an image detecting apparatus comprising image sensing means for sensing a mark formed on an object, first calculating means for obtaining an energy distribution in frequency space by orthogonally transforming a partial image of an image of the mark obtained by the image sensing means, and an energy distribution in real space by inversely orthogonally transforming the energy distribution, and second calculating means for calculating a degree of correlation between the energy distribution obtained by the first calculating means, and an energy distribution of the mark obtained in advance.

Twelfth Example

In the eleventh example, the second calculating means calculates the degree of correlation based upon a power spectrum of each energy distribution for which the degree of correlation is calculated.

Thirteenth Example

In the twelfth example, the second calculating means calculates the degree of correlation based upon each distribution obtained by normalizing, by a sum of element values, each energy distribution for which the degree of correlation is calculated.

Fourteenth Example

A fourteenth example of the invention is an image detecting method comprising an image sensing step of sensing a mark formed on an object, a first calculating step of obtaining an energy distribution in frequency space by orthogonally transforming a partial image of an image of the mark obtained at the image sensing step, and an energy distribution in real space by inversely orthogonally transforming the energy distribution, and a second calculating step of calculating degree of correlation between the energy distribution obtained at the first calculating step and an energy distribution of the mark obtained in advance.

Fifteenth Example

A fifteenth example of the invention is an exposure apparatus having a position detecting apparatus set forth in the first to thirteenth examples, wherein a substrate or a reticle, or both, are positioned by the position detecting apparatus, and the substrate is exposed to the pattern on the reticle.

Sixteenth Example

A sixteenth example of the invention is a device manufacturing method having a step of performing exposure using the exposure apparatus of the fifteenth example.

The invention claimed is:

1. An apparatus for detecting a position of a region, corresponding to a mark, in image data, as a mark position, the mark including periodically arranged patterns, said apparatus comprising:
    a first unit configured to obtain a real-space energy distribution which corresponds to an energy spectrum distribution of each partial area of the image data;
    a probability distribution obtaining unit configured to obtain a probability distribution based on the real-space energy distribution, the probability distribution indicating repetitive positions of the periodically arranged patterns and the intensity of periodicity at this position;
    a second unit configured to obtain a degree of correlation between each probability distribution obtained by said probability distribution obtaining unit and a pre-registered probability distribution of the mark; and
    a third unit configured to obtain the mark position based upon the degrees of correlation obtained by said second unit.

2. An apparatus according to claim 1, wherein said third unit obtains, as the mark position, a representative position of a partial area, which corresponds to a maximum value among the degrees of correlation.

3. An apparatus according to claim 1, wherein said first unit obtains the real-space energy distribution by applying an inverse orthogonal transform to the energy spectrum distribution, which has been obtained by applying an orthogonal transform to the partial area.

4. An apparatus according to claim 1, further comprising a fourth unit configured to obtain a real-space energy distribution, which corresponds to an energy spectrum distribution of image data of the mark.

5. An apparatus according to claim 1, wherein said second unit obtains the degree of correlation by calculating any one of a correlation value obtained using only specific components of the real-space energy distributions, a correlation value obtained using power spectra of the real-space energy distributions, and a correlation value obtained using contribution rates of specific components of the real-space energy distributions.

6. An apparatus according to claim 3, wherein the orthogonal transform is any one of a Fourier transform, a wavelet transform, a cosine transform and a sine transform.

7. An apparatus according to claim 1, wherein the energy spectrum distribution has been normalized using maximum and minimum values of energy spectra of the partial area.

8. An apparatus according to claim 1, wherein the real-space energy distribution has been normalized using maximum and minimum values of real-space energy of the mark.

9. An exposure apparatus for exposing a substrate, having a mark, to a pattern, said apparatus comprising:
    an image input system which inputs image data of the mark; and
    a detection system which detects a position of a region, corresponding to the mark, in the image data, as a mark position, the mark including periodically arranged patterns, said detection system comprising:
        (i) first unit configured to obtain a real-space energy distribution which corresponds to an energy spectrum distribution of each partial area of the image data;
        (ii) a probability distribution obtaining unit configured to obtain a probability distribution based on the real-space energy distribution, the probability distribution indicating repetitive positions of the periodically arranged patterns and the intensity of periodicity at this position;
        (iii) a second unit configured to obtain a degree of correlation between each probability distribution obtained by said probability distribution obtaining unit and a pre-registered probability distribution of the mark; and
        (iv) a third unit configured to obtain the mark position based upon the degrees of correlation obtained by said second unit.

10. A device manufacturing method comprising the steps of:
    (A) exposing a substrate to a pattern using an exposure apparatus comprising:
        (a) an image input unit which inputs image data of a mark; and
        (b) a detection system which detects a position of a region, corresponding to the mark, in the image data, as a mark position, the mark including periodically arranged patterns, the detection system comprising: (i) a first unit configured to obtain a real-space energy distribution which corresponds to an energy spectrum distribution of each partial area of the image data; (ii) a probability distribution obtaining unit configured to obtain a probability distribution based on the real space energy distribution, the probability distribution indicating repetitive positions of the periodically arranged patterns and the intensity of periodicity at this position; (iii) a second unit configured to obtain a degree of correlation between each probability distribution obtained by the probability distribution obtaining unit and a pre-registered probability distribution of the mark; and (iv) a third unit configured to obtain the mark position based upon the degrees of correlation obtained by the second unit; and
    (B) developing the exposed substrate.

11. A method of detecting a position of a region, corresponding to a mark, in image data, as a mark position, the mark including periodically arranged patterns, said method comprising:
    a first step of obtaining a real-space energy distribution which corresponds to an energy spectrum distribution of each partial area of the image data;
    a probability distribution obtaining step of obtaining a probability distribution based on the real-space energy distribution, the probability distribution indicating repetitive positions of the periodically arranged patterns and the intensity of periodicity at this position;
    a second step of obtaining a degree of correlation between a probability distribution obtained in said probability distribution obtaining step and a pre-registered probability distribution of the mark; and
    a third step of obtaining the mark position based upon the degrees of correlation obtained in said second step.

12. A method according to claim 11, wherein a representative position of a partial area, which corresponds to a maximum value among the degrees of correlation, is obtained as the mark position in said third step.

13. A method according to claim 11, wherein the real-space energy distribution is obtained in said first step by applying an inverse orthogonal transform to the energy spectrum distribution, which has been obtained by applying an orthogonal transform to the partial area.

14. A method according to claim 11, further comprising a fourth step of obtaining a real-space energy spectrum distribution which corresponds to an energy spectrum distribution of image data of the mark.

15. A method according to claim 11, wherein the degree of correlation is obtained in said second step by calculating any one of a correlation value obtained using only specific components of the real-space energy distributions, a correlation value obtained using power spectra of the real-space energy distributions, and a correlation value obtained using contribution rates of specific components of the real-space energy distributions.

16. A method according to claim 13, wherein the orthogonal transform is any one of a Fourier transform, a wavelet transform, a cosine transform and a sine transform.

17. A method according to claim 11, wherein the energy spectrum distribution has been normalized using maximum and minimum values of energy distribution of the partial area.

18. A method according to claim 11, wherein the real-space energy distribution has been normalized using maximum and minimum values of real-space energy of the mark.

* * * * *